Patented Oct. 9, 1934

1,976,682

UNITED STATES PATENT OFFICE 1,976,682

PRODUCTION OF ADDITION COMPOUNDS OF FORMYL HALIDES

Heinrich Hopff, Ludwigshafen-on-the-Rhine, Germany, assignor to I. G. Farbenindustrie Aktiengesellschaft, Frankfort - on - the - Main, Germany No Drawing. Application February 1, 1933, Serial No. 654,766. In Germany February 19, 1932

8 Claims. (Cl. 260—11)

The present invention relates to the production of addition compounds of formyl halides.

I have found that formyl halides are obtained in the form of their addition compounds with aluminium halides by causing practically anhydrous hydrogen halides, such as hydrogen chloride, bromide or iodide, and an at least equimolecular proportion of carbon monoxide to act at an elevated pressure on an at the most equimolecular proportion of practically anhydrous aluminium halides in the presence of copper.

The conversion takes place at room temperature and becomes evident by reason of a marked fall in the pressure; it is preferable, however, to work at elevated temperatures, as for example at from about 50° to about 60° C. The aluminium halides may be chosen from anhydrous aluminium chloride, bromide and iodide. The reaction components are preferably employed in molecular proportions but for a rapid course of the reaction it is advantageous to employ an excess of hydrogen halide and carbon monoxide. When such an excess is used, an addition compound is formed which contains more than one molecule of formyl halide to each molecule of anhydrous aluminium halide.

The copper may be present in the reaction vessel in any desired form, for example as copper lining of the reaction vessel and/or as powder, granules or shavings, or in the form of copper halides such as cuprous chloride, and is employed in at least equimolecular proportions with reference to the aluminium halide. The pressure employed should, generally, be above 5 atmospheres, preferably between about 20 and about 250 atmospheres.

The reaction products are usually brownish to grey colored, rather tough or viscous more or less liquid masses which contain copper and solidify to form a crystal cake when cooled to from 10° to zero C. The free formyl halides cannot be recovered therefrom because when the additional compound is decomposed, for example with ice, the formyl halides are split up into carbon monoxide and hydrogen halide. The addition compounds, however, may be employed very suitably as such for the introduction of the CO group into organic compounds, as for example hydrocarbons and their derivatives; thus, for example, by the action of the addition compound of anhydrous aluminium chloride and formyl chloride, bromide or iodide on benzene or toluene, benzaldehyde, or para-toluylaldehyde, respectively, are obtained even at room temperature; or by the action of the said addition compounds on alcohols, as for example ethyl alcohol, the corresponding formic esters are easily obtained, the said addition compounds allowing, moreover, of easily working with definite quantities in contrast to reactions carried out with carbon monoxide.

The following examples will further illustrate the nature of this invention but the invention is not restricted to these examples. The parts are by weight.

Example 1

1,000 parts of anhydrous aluminium chloride are treated in a highly pressure-tight, copper-lined autoclave with a mixture of gaseous hydrogen chloride and carbon monoxide at a pressure of from 120 to 150 atmospheres (corresponding to a gaseous pressure of about 30 atmospheres of hydrogen chloride and about 100 atmospheres of carbon monoxide) and at 50° C. until no further decrease in pressure takes place. The reaction product obtained in a yield of about 2,000 parts, is a brownish colored viscous liquid.

Example 2

1,000 parts of anhydrous aluminium iodide are heated to 50° C. in an enamelled pressure-tight vessel, containing 150 parts of copper shavings, with 300 parts of hydrogen iodide and 500 parts of carbon monoxide at a pressure of 60 atmospheres until the pressure remains constant. About 1,850 parts of a brown, tough mass are obtained which crystallizes when cooled to about 5° C. and decomposes when contacted with ice, water or other hydroxyl-bearing substances.

What I claim is:—

1. The process for the production of addition compounds of formyl halides with aluminium halides which comprises reacting a practically anhydrous hydrogen halide and an at least equimolecular proportion of carbon monoxide at superatmospheric pressure with an at the most equimolecular proportion of a practically anhydrous aluminium halide in the presence of copper in a quantity at least equimolecular to said aluminium halide.

2. The process for the production of addition compounds of formyl halides with aluminium halides which comprises reacting a practically anhydrous hydrogen halide and an at least equimolecular proportion of carbon monoxide at superatmospheric pressure, while warming, with an at the most equimolecular proportion of a practically anhydrous aluminium halide in the presence of copper in a quantity at least equimolecular to said aluminium halide.

3. The process for the production of addition compounds of formyl halides with aluminium halides which comprises reacting a practically anhydrous hydrogen halide and an at least equimolecular proportion of carbon monoxide at a pressure of from about 20 to about 250 atmospheres with an at the most equimolecular proportion of a practically anhydrous aluminium halide in the presence of copper in a quantity at least equimolecular to said aluminium halide.

4. The process for the production of addition compounds of formyl halides with aluminium halides which comprises reacting a practically anhydrous hydrogen halide and an at least equimolecular proportion of carbon monoxide at a pressure of from about 20 to about 200 atmospheres, while warming to from about 50° to about 60° C., with an at the most equimolecular proportion of a practically anhydrous aluminium halide in the presence of copper in a quantity at least equimolecular to said aluminium halide.

5. The process for the production of addition compounds of formyl halides with aluminium halides which comprises reacting practically anhydrous hydrogen chloride and an at least equimolecular proportion of carbon monoxide at a pressure of from about 20 to about 200 atmospheres, while warming to from about 50° to about 60° C. with an at the most equimolecular proportion of a practically anhydrous aluminium chloride in the presence of copper in a quantity at least equimolecular to said aluminium halide.

6. The process for the production of addition compounds of formyl halides with aluminium halides which comprises reacting practically anhydrous hydrogen iodide and an at least equimolecular proportion of carbon monoxide at a pressure of from about 20 to about 200 atmospheres with an at the most equimolecular proportion of a practically anhydrous aluminium iodide in the presence of copper in a quantity at least equimolecular to said aluminium halide.

7. From brownish to grey, normally viscous, copper-bearing addition compounds of a formyl halide with an aluminium halide, which addition compounds solidify to crystalline masses on cooling to about 0° C. and give off carbon monoxide and hydrogen halide when mixed with ice.

8. A brownish, normally viscous liquid, copper-bearing addition compound of formyl chloride with aluminium chloride, which solidifies to a crystalline mass on cooling to about 0° C. and gives off carbon monoxide and hydrogen chloride when mixed with ice.

HEINRICH HOPFF.